United States Patent
Richter et al.

(10) Patent No.: US 12,148,066 B2
(45) Date of Patent: *Nov. 19, 2024

(54) METHOD AND DEVICE FOR PRESENTING SYNTHESIZED REALITY COMPANION CONTENT

(71) Applicant: Apple Inc., Cupertino, CA (US)

(72) Inventors: Ian M. Richter, Los Angeles, CA (US); Daniel Ulbricht, Sunnyvale, CA (US); Jean-Daniel E. Nahmias, San Francisco, CA (US); Omar Elafifi, Oakland, CA (US); Peter Meier, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,311

(22) Filed: Jun. 28, 2023

(65) Prior Publication Data

US 2023/0351644 A1 Nov. 2, 2023

Related U.S. Application Data

(63) Continuation of application No. 17/707,774, filed on Mar. 29, 2022, now Pat. No. 11,727,606, which is a
(Continued)

(51) Int. Cl.
*G06T 11/00* (2006.01)
*G06F 3/04883* (2022.01)

(52) U.S. Cl.
CPC .......... *G06T 11/00* (2013.01); *G06F 3/04883* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 2004/0107169 A1* | 6/2004 | Lowe | G06F 16/48 707/999.009 |
| 2009/0013263 A1* | 1/2009 | Fortnow | G06Q 10/10 715/753 |

(Continued)

FOREIGN PATENT DOCUMENTS

| | | |
|---|---|---|
| EP | 0899691 A2 | 3/1999 |
| JP | 11134084 A | 5/1999 |

(Continued)

OTHER PUBLICATIONS

PCT International Search Report and Written Opinion dated Apr. 2, 2019, International Application No. PCT/US2019/014225, pp. 1-9.
(Continued)

*Primary Examiner* — Edward Martello
(74) *Attorney, Agent, or Firm* — Fernando & Partners, LLP

(57) ABSTRACT

In one implementation, a method includes: obtaining a user input to view SR content associated with video content; if the video content includes a first scene when the user input was detected: obtaining first SR content for a first time period of the video content associated with the first scene; obtaining a task associated with the first scene; and causing presentation of the first SR content and a first indication of the task associated with the first scene; and if the video content includes a second scene when the user input was detected: obtaining second SR content for a second time period of the video content associated with the second scene; obtaining a task associated with the second scene; and causing presentation of the second SR content and a second indication of the task associated with the second scene.

23 Claims, 12 Drawing Sheets

Related U.S. Application Data continuation of application No. 16/963,308, filed as application No. PCT/US2019/014225 on Jan. 18, 2019, now Pat. No. 11,328,456.

(60) Provisional application No. 62/734,050, filed on Sep. 20, 2018, provisional application No. 62/620,326, filed on Jan. 22, 2018.

(56) References Cited

U.S. PATENT DOCUMENTS

| | | | |
|---|---|---|---|
| 2009/0043870 A1* | 2/2009 | Ikezoye | H04N 21/26603 709/219 |
| 2009/0144785 A1* | 6/2009 | Walker | H04N 5/262 725/105 |
| 2011/0219419 A1* | 9/2011 | Reisman | H04N 21/8586 725/112 |
| 2013/0044129 A1* | 2/2013 | Latta | H04N 13/344 345/633 |
| 2013/0335407 A1* | 12/2013 | Reitan | G06T 13/40 345/419 |
| 2014/0310595 A1* | 10/2014 | Acharya | G06F 3/011 715/706 |
| 2016/0163063 A1* | 6/2016 | Ashman | G06T 19/006 345/633 |

FOREIGN PATENT DOCUMENTS

| | | |
|---|---|---|
| KR | 1020100055048 | 3/2011 |
| KR | 20170092632 A | 8/2017 |

OTHER PUBLICATIONS

Notice of Preliminary Rejection issued Jul. 27, 2021 from the Korean Intellectual Property Office, Korean Patent Application No. 10-2020-7021318 (Including English Translation of Rejection).

Notice of Final Preliminary Rejection issued Jan. 26, 2022 from the Korean Intellectual Property Office, Korean Patent Application No. 10-2020-7021318 (Including English Translation of Rejection).

* cited by examiner

METHOD AND DEVICE FOR PRESENTING SYNTHESIZED REALITY COMPANION CONTENT

CROSS REFERENCE TO RELATED APPLICATIONS

This application claims priority to U.S. provisional patent application No. 62/620,326, filed on Jan. 22, 2018, U.S. provisional patent application No. 62/734,050, filed on Sep. 20, 2018, International patent application number PCT/US2019/014225, filed on Jan. 18, 2019, U.S. non-provisional patent application Ser. No. 16/963,308, filed on Jul. 20, 2020, and U.S. non-provisional patent application Ser. No. 17/707,774, filed on Mar. 29, 2022, which are hereby incorporated by reference in their entireties.

TECHNICAL FIELD

The present disclosure generally relates to synthesized reality (SR) content consumption, and in particular, to systems, methods, and devices for presenting SR companion content.

BACKGROUND

Virtual reality (VR) and augmented reality (AR) are becoming more popular due to their remarkable ability to alter a user's perception of the world. For example, VR and AR are used for learning purposes, gaming purposes, content creation purposes, social media and interaction purposes, or the like. These technologies differ in the user's perception of his/her presence. VR transposes the user into a virtual space so their VR perception is different from his/her real-world perception. In contrast, AR takes the user's real-world perception and adds something to it.

These technologies are becoming more commonplace due to, for example, miniaturization of hardware components, improvements to hardware performance, and improvements to software efficiency. As one example, a user may experience AR content superimposed on a live video feed of the user's setting on a handheld display (e.g., an AR-enabled mobile phone or tablet with video pass-through). As another example, a user may experience AR content by wearing a head-mounted device (HMD) or head-mounted enclosure that still allows the user to see his/her surroundings (e.g., glasses with optical see-through). As yet another example, a user may experience VR content by using an HMD that encloses the user's field-of-view and is tethered to a computer.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
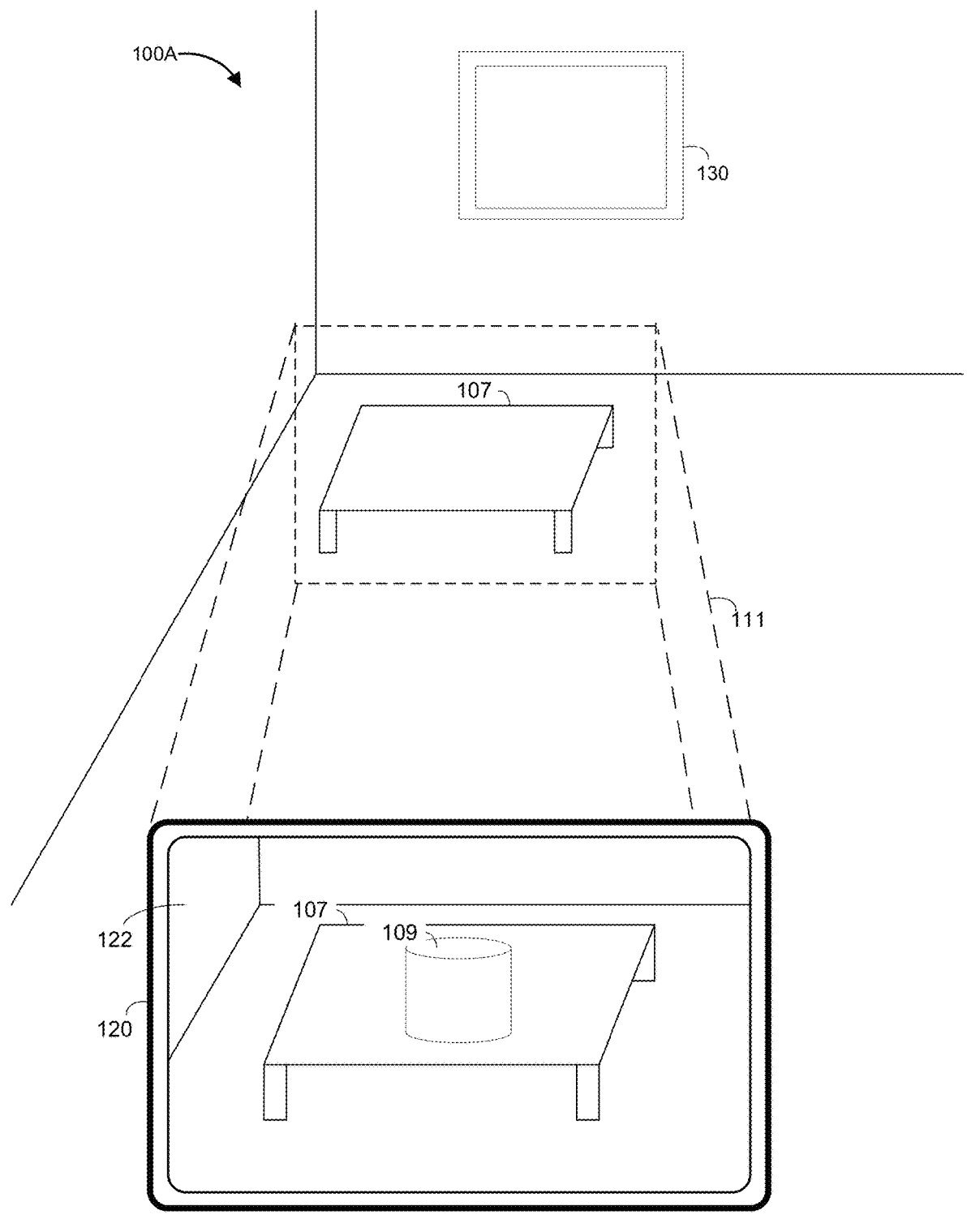
FIG. 1A is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for presenting synthesized reality (SR) companion content. According to some implementations, the method is performed at a device including non-transitory memory and one or more processors coupled with the non-transitory memory. The method includes: while causing presentation of video content having a current plot setting, receiving a user input indicating a request to explore the current plot setting; obtaining SR content associated with the current plot setting in response to receiving the user input; causing presentation of the SR content associated with the current plot setting; receiving one or more user interactions with the SR content; and adjusting the presentation of the SR content in response to receiving the one or more user interactions with the SR content.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a synthesized reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

While a user is watching a television (TV) episode or movie, he/she may wish to explore the current plot setting as an SR experience. However, SR content associated with the TV episode or movie may be unavailable or separate from the flat video content (e.g., a 2-dimensional or "flat" AVI, FLV, WMV, MOV, MP4, or the like file type). As such, the disclosed invention allows the user to seamlessly experience SR companion content while watching flat video content. According to some implementations, while watching the flat video content a subtle affordance or notification indicates that SR companion content associated with a current plot setting in the flat video content is available for the user to enter and/or explore. As such, the user transitions from watching the flat video content to an SR experience without having to separately search for and/or load the SR content and vice versa.

As one example, that SR companion content enables the user to inspect objects in the plot setting, fight villains, question characters in the plot setting, open doors and explore adjacent rooms, locomote within the plot setting, and/or the like. As another example, that SR companion content includes a task or mission associated with the plot setting for the user to perform in order to drive the plot forward such as retrieving an item associated with the plot setting or clearing a path in the plot setting of bad guys or debris for the protagonist of the video content. As yet another example, the SR companion content includes an educational aide or auxiliary information associated with video content such as an AR version of the Ho Chi Minh Trail or an AR battlefield map showing the location of military battalions while watching a documentary on the Vietnam War. As yet another example, the SR companion content leverages the user's current environs when providing a task for the user to perform in order to drive the plot forward such as collecting AR candies scattered around the user's living room to give to a protagonist in the video content.

FIG. 1A is a block diagram of an example operating architecture 100A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100A includes an electronic device 120 and an optional display device 130.

In some implementations, the electronic device 120 is configured to present the SR experience to a user. In some implementations, the electronic device 120 includes a suitable combination of software, firmware, and/or hardware. The electronic device 120 is described in greater detail below with respect to FIG. 3. According to some implementations, the electronic device 120 presents, via a display 122, a synthesized reality (SR) experience to the user while the user is physically present within a physical setting 103 that includes a table 107 within the field-of-view 111 of the electronic device 120. As such, in some implementations, the user holds the electronic device 120 in his/her hand(s). In some implementations, while presenting an augmented reality (AR) experience, the electronic device 120 is configured to present AR content (e.g., an AR cylinder 109) and to enable video pass-through of the physical setting 103 (e.g., including the table 107) on a display 122.

In some implementations, the display device 130 is configured to present media content (e.g., video and/or audio content) to the user. In some implementations, the display device 130 corresponds to a television or a computing device such as a desktop computer, kiosk, laptop computer, tablet, mobile phone, wearable computing device, or the like. In some implementations, the display device 130 includes a suitable combination of software, firmware, and/or hardware. The display device 130 is described in greater detail below with respect to FIG. 4.

Figure 1B:
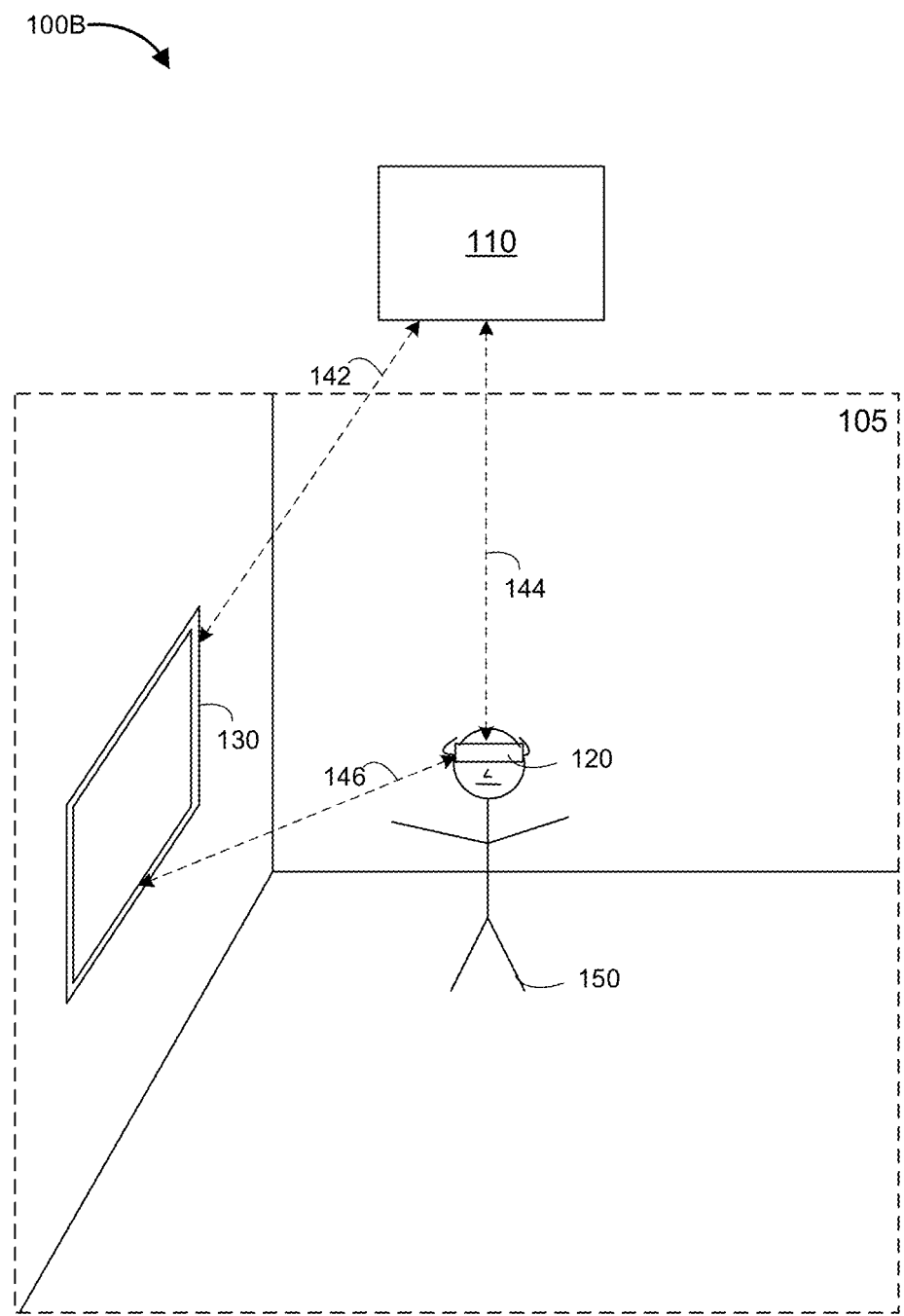
FIG. 1B is a block diagram of another example operating architecture in accordance with some implementations.

FIG. 1B is a block diagram of an example operating architecture 100B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100B includes a controller 110, an electronic device 120, and an optional display device 130.

In some implementations, the controller 110 is configured to manage and coordinate an SR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical setting 105. For example, the controller 110 is a local server located within the physical setting 105. In another example, the controller 110 is a remote server located outside of the physical setting 105 (e.g., a cloud server, central server, etc.).

In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the controller 110 is communicatively coupled with the display device 130 via one or more wired or wireless communication channels 142 (e.g., BLUETOOTH, IEEE 802.11x, IEEE 802.16x, IEEE 802.3x, etc.). In some implementations, the electronic device 120 is communicatively coupled with the display device 130 via one or more wired or wireless communication channels 146 (e.g., BLUETOOTH, IEEE 802.11x, IEEE 802.16x, IEEE 802.3x, etc.).

In some implementations, the electronic device 120 is configured to present the SR experience to the user 150. In some implementations, the electronic device 120 includes a suitable combination of software, firmware, and/or hardware. The electronic device 120 is described in greater detail below with respect to FIG. 3. In some implementations, the functionalities of the controller 110 and/or the display device 130 are provided by and/or combined with the electronic device 120.

According to some implementations, the electronic device 120 presents a synthesized reality (SR) experience to the user 150 while the user 150 is virtually and/or physically present within a physical setting 105. In some implementations, while presenting an augmented reality (AR) experience, the electronic device 120 is configured to present AR content and to enable optical see-through of the physical setting 105. In some implementations, while presenting a virtual reality (VR) experience, the electronic device 120 is configured to present VR content and to optionally enable video pass-through of the physical setting 105.

In some implementations, the user 150 wears the electronic device 120 on his/her head such as a head-mounted device (HMD). As such, the electronic device 120 includes one or more displays provided to display the SR content. For example, the electronic device 120 encloses the field-of-view of the user 150. As another example, the electronic device 120 slides into or otherwise attaches to a head mounted enclosure. In some implementations, the electronic device 120 is replaced with an SR chamber, enclosure, or room configured to present SR content in which the user 150 does not wear the electronic device 120.

In some implementations, the display device 130 is configured to present media content (e.g., video and/or audio content) to the user 150. In some implementations, the display device 130 corresponds to a television or a computing device such as a desktop computer, kiosk, laptop computer, tablet, mobile phone, wearable computing device, or the like. In some implementations, the display device 130 includes a suitable combination of software, firmware, and/or hardware. The display device 130 is described in greater detail below with respect to FIG. 4.

Figure 2:
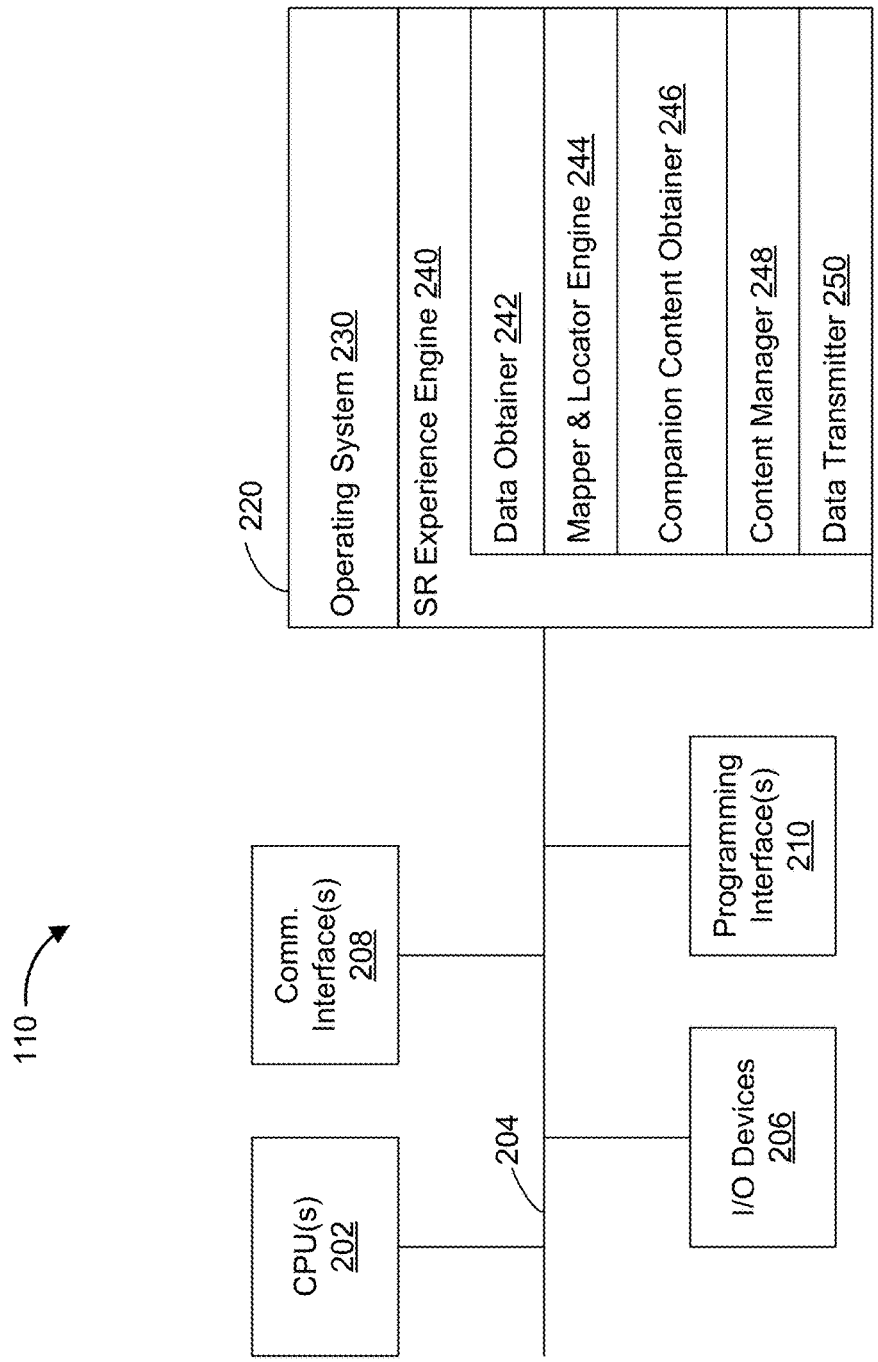
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a synthesized reality (SR) experience engine 240.

The operating system 230 includes procedures for handling various basic system services and for performing hardware dependent tasks. In some implementations, the SR experience engine 240 is configured to manage and coordinate one or more SR experiences for one or more users (e.g., a single SR experience for one or more users, or multiple SR experiences for respective groups of one or more users). To that end, in various implementations, the SR experience engine 240 includes a data obtainer 242, a tracker and locator engine 244, a companion content obtainer 246, a content management unit 248, and a data transmitter 250.

In some implementations, the data obtainer 242 is configured to obtain data (e.g., presentation data, user interaction data, sensor data, location data, etc.) from at least one of sensors in the physical setting 105, sensors associated with the controller 110, the electronic device 120, and the display device 130. To that end, in various implementations, the data obtainer 242 includes instructions and/or logic therefor, and heuristics and metadata therefor.

In some implementations, the tracker and locator engine 244 is configured to map the physical setting 105 and to track the position/location of at least one of the electronic device 120 and the display device 130 with respect to the physical setting 105. To that end, in various implementations, the tracker and locator engine 244 includes instructions and/or logic therefor, and heuristics and metadata therefor.

In some implementations, the companion content obtainer 246 is configured to obtain (e.g., receive, retrieve, or generate) SR content (e.g., companion content correlated with the video content) associated with the video content presented to the user via the display device 130. To that end, in various implementations, the companion content obtainer 246 includes instructions and/or logic therefor, and heuristics and metadata therefor.

In some implementations, the content management unit 248 is configured to manage and coordinate the video content (e.g., presented to the user via the display device 130) and the SR content associated with the video content (e.g., presented to the user by the electronic device 120). To that end, in various implementations, the content management unit 248 includes instructions and/or logic therefor, and heuristics and metadata therefor.

In some implementations, the data transmitter 250 is configured to transmit data (e.g., presentation data, location data, etc.) to at least one of the electronic device 120 and the display device 130. To that end, in various implementations, the data transmitter 250 includes instructions and/or logic therefor, and heuristics and metadata therefor.

Although the data obtainer 242, the tracker and locator engine 244, the companion content obtainer 246, the content management unit 248, and the data transmitter 250 are shown as residing on a single device (e.g., the controller 110), it should be understood that in other implementations, any combination of the data obtainer 242, the tracker and locator engine 244, the companion content obtainer 246, the content management unit 248, and the data transmitter 250 may be located in separate computing devices.

Moreover, FIG. 2 is intended more as a functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 3:
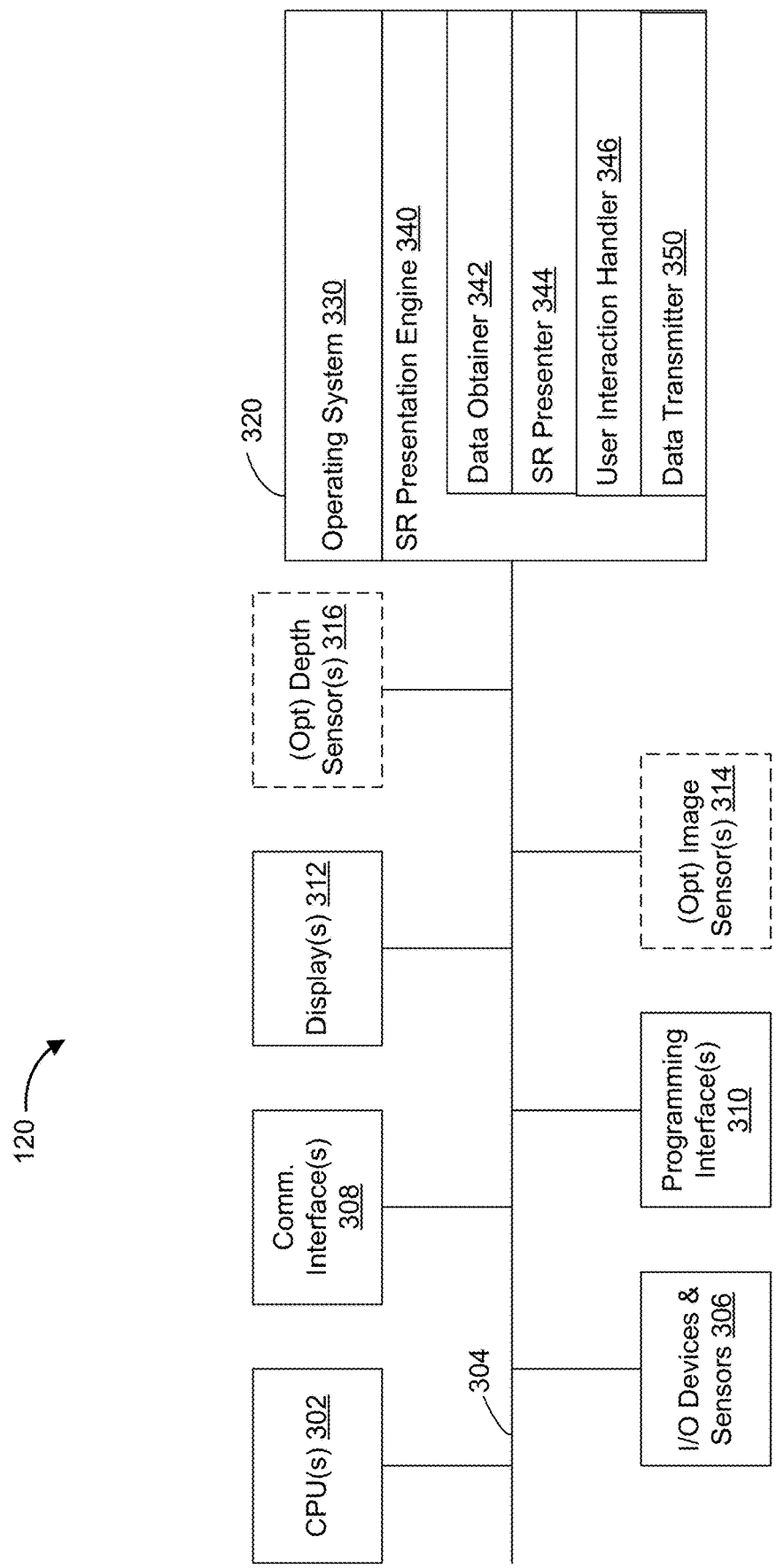
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, one or more optional interior and/or exterior facing image sensors 314, one or more optional depth sensors 316, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, and/or the like.

In some implementations, the one or more displays 312 are configured to present the SR experience to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical setting 105). In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more optional image sensors 314 are configured to obtain image data that corresponds to at least a portion of the face of the user that includes the eyes of the user. For example, the one or more optional image sensors 314 correspond to one or more RGB cameras (e.g., with a complementary metal-oxide-semiconductor (CMOS) image sensor or a charge-coupled device (CCD) image sensor), infrared (IR) image sensors, event-based cameras, and/or the like.

In some implementations, the one or more optional depth sensors 316 are configured to obtain depth data that corresponds to at least a portion of the face of the user and to synthesize a depth/mesh map of the face of the user, where the mesh map characterizes the facial topography of the user. For example, the one or more optional depth sensors 316 correspond to a structured light device, a time-of-flight device, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an SR presentation engine 340.

The operating system 330 includes procedures for handling various basic system services and for performing hardware dependent tasks. In some implementations, the SR presentation engine 340 is configured to present SR content to the user via the one or more displays 312. To that end, in various implementations, the SR presentation engine 340 includes a data obtainer 342, an SR presenter 344, a user interaction handler 346, and a data transmitter 350.

In some implementations, the data obtainer 342 is configured to obtain data (e.g., presentation data, user interaction data, sensor data, location data, etc.) from at least one of sensors in the physical setting 105, sensors associated with the electronic device 120, the controller 110, and the display device 130. To that end, in various implementations, the data obtainer 342 includes instructions and/or logic therefor, and heuristics and metadata therefor.

In some implementations, the SR presenter 344 is configured to present SR content via the one or more displays 312. In some implementations, the SR presenter 344 is also configured to present flat video content via the one or more displays 312. To that end, in various implementations, the SR presenter 344 includes instructions and/or logic therefor, and heuristics and metadata therefor.

In some implementations, the user interaction handler 346 is configured to detect and interpret user interactions with the presented SR content. To that end, in various implementations, the user interaction handler 346 includes instructions and/or logic therefor, and heuristics and metadata therefor.

In some implementations, the data transmitter 350 is configured to transmit data (e.g., presentation data, location data, user interaction data, etc.) to at least one of the controller 110 and the display device 130. To that end, in various implementations, the data transmitter 350 includes instructions and/or logic therefor, and heuristics and metadata therefor.

Although the data obtainer 342, the SR presenter 344, the user interaction handler 346, and the data transmitter 350 are shown as residing on a single device (e.g., the electronic device 120), it should be understood that in other implementations, any combination of the data obtainer 342, the SR presenter 344, the user interaction handler 346, and the data transmitter 350 may be located in separate computing devices.

Moreover, FIG. 3 is intended more as a functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 4:
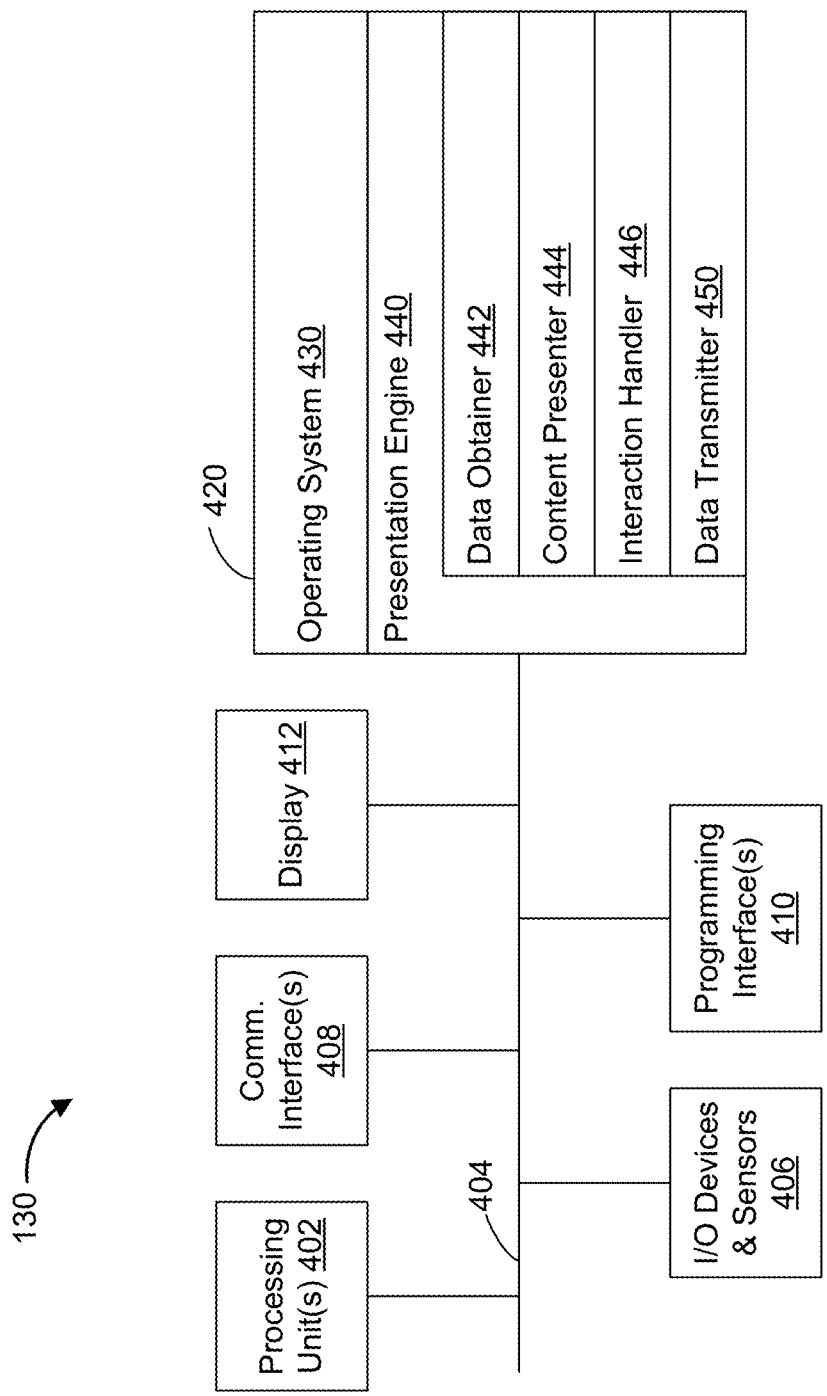
FIG. 4 is a block diagram of an example display device in accordance with some implementations.

FIG. 4 is a block diagram of an example of the display device 130 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the display device 130 includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 410, a display 412, a memory 420, and one or more communication buses 404 for interconnecting these and various other components. In some implementations, the display device 130 is optionally controlled by a remote-control device, voice commands, the electronic device 120, or the like.

In some implementations, the one or more communication buses 404 include circuitry that interconnects and controls communications between system components. In some implementations, the one or more I/O devices and sensors 406 include at least one of one or more IR sensors, one or more physical buttons, one or more microphones, one or more speakers, one or more image sensors, one or more depth sensors, and/or the like.

In some implementations, the display 412 corresponds to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and a presentation engine 440.

The operating system 430 includes procedures for handling various basic system services and for performing hardware dependent tasks. In some implementations, the presentation engine 440 is configured to present media content (e.g., video and/or audio content) to users via the display 412 and the one or more I/O devices and sensors 406 (e.g., one or more speakers). To that end, in various implementations, the presentation engine 440 includes a data obtainer 442, a content presenter 444, an interaction handler 446, and a data transmitter 450.

In some implementations, the data obtainer 442 is configured to obtain data (e.g., presentation data, user interaction data, etc.) from at least one of sensors in the physical setting 105, sensors associated with the display device 130, the controller 110, and the electronic device 120. To that end, in various implementations, the data obtainer 442 includes instructions and/or logic therefor, and heuristics and metadata therefor.

In some implementations, the content presenter 444 is configured to render and display video content via the display 412. To that end, in various implementations, the content presenter 444 includes instructions and/or logic therefor, and heuristics and metadata therefor.

In some implementations, the interaction handler 446 is configured to detect and interpret user interactions with the display device 130 (e.g., navigation, playback, tuning, volume adjustment, or the like commands). To that end, in various implementations, the interaction handler 446 includes instructions and/or logic therefor, and heuristics and metadata therefor.

In some implementations, the data transmitter 450 is configured to transmit data (e.g., presentation data, user interaction data, etc.) to at least one of the controller 110 and the electronic device 120. To that end, in various implementations, the data transmitter 450 includes instructions and/or logic therefor, and heuristics and metadata therefor.

Although the data obtainer 442, the content presenter 444, the interaction handler 446, and the data transmitter 450 are shown as residing on a single device (e.g., the display device 130), it should be understood that in other implementations, any combination of the data obtainer 442, the content presenter 444, the interaction handler 446, and the data transmitter 450 may be located in separate computing devices.

Moreover, FIG. 4 is intended more as a functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 5:
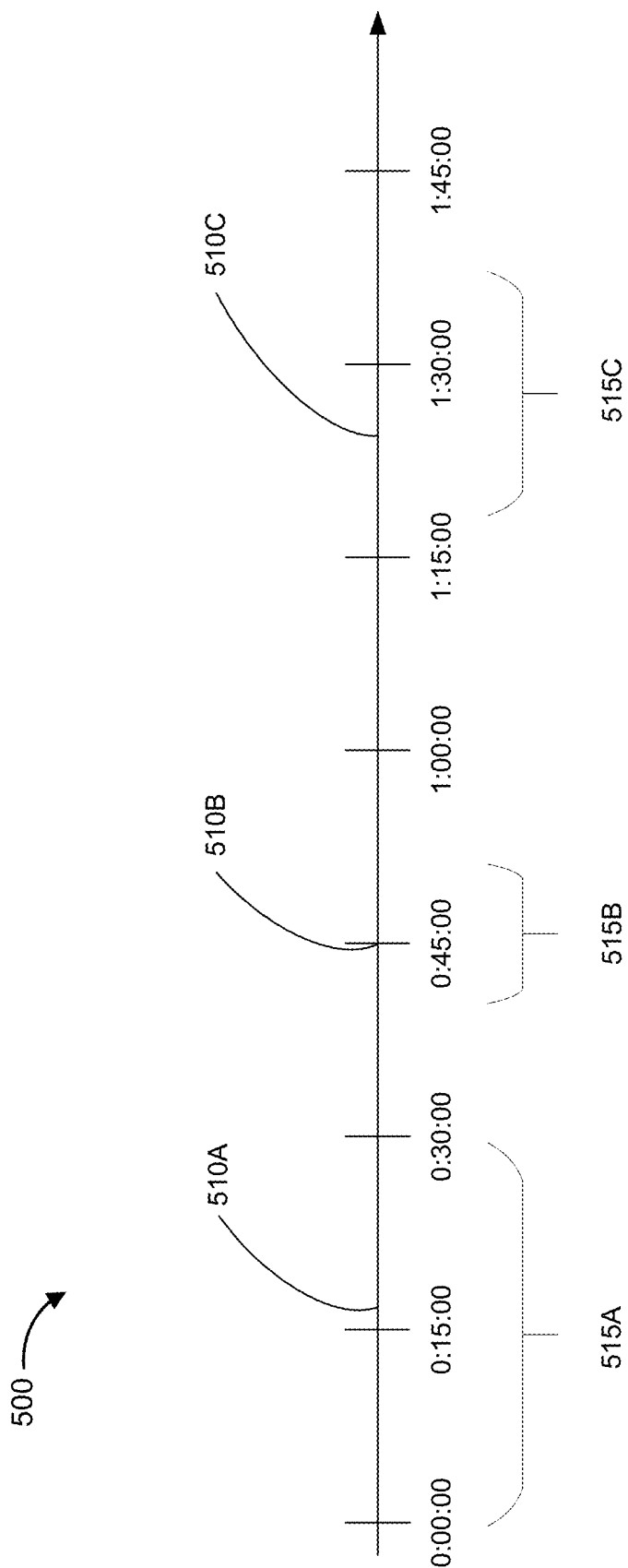
FIG. 5 illustrates an example content timeline in accordance with some implementations.

FIG. 5 illustrates an example content timeline 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content timeline 500 includes plot settings 515A, 515B, and 515C associated with different time periods of the video content within the content timeline 500 (e.g., a spaceship engine room scene, a spaceship bridge scene, and a transport craft cockpit scene). As one example, in FIG. 5, SR companion content 510A is associated with plot setting 515A (e.g., a mission to help the crew fix the fusion reactor in the spaceship engine room). As another example, the SR companion content 510B is associated with plot setting 515B (e.g., the ability to explore the spaceship bridge and interact with the crew). As yet another example, the SR companion content 510C is associated with plot setting 515C (e.g., a mission to help navigate the transport craft).

FIGS. 6A-6D illustrate example playback scenarios in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

Figure 6A:
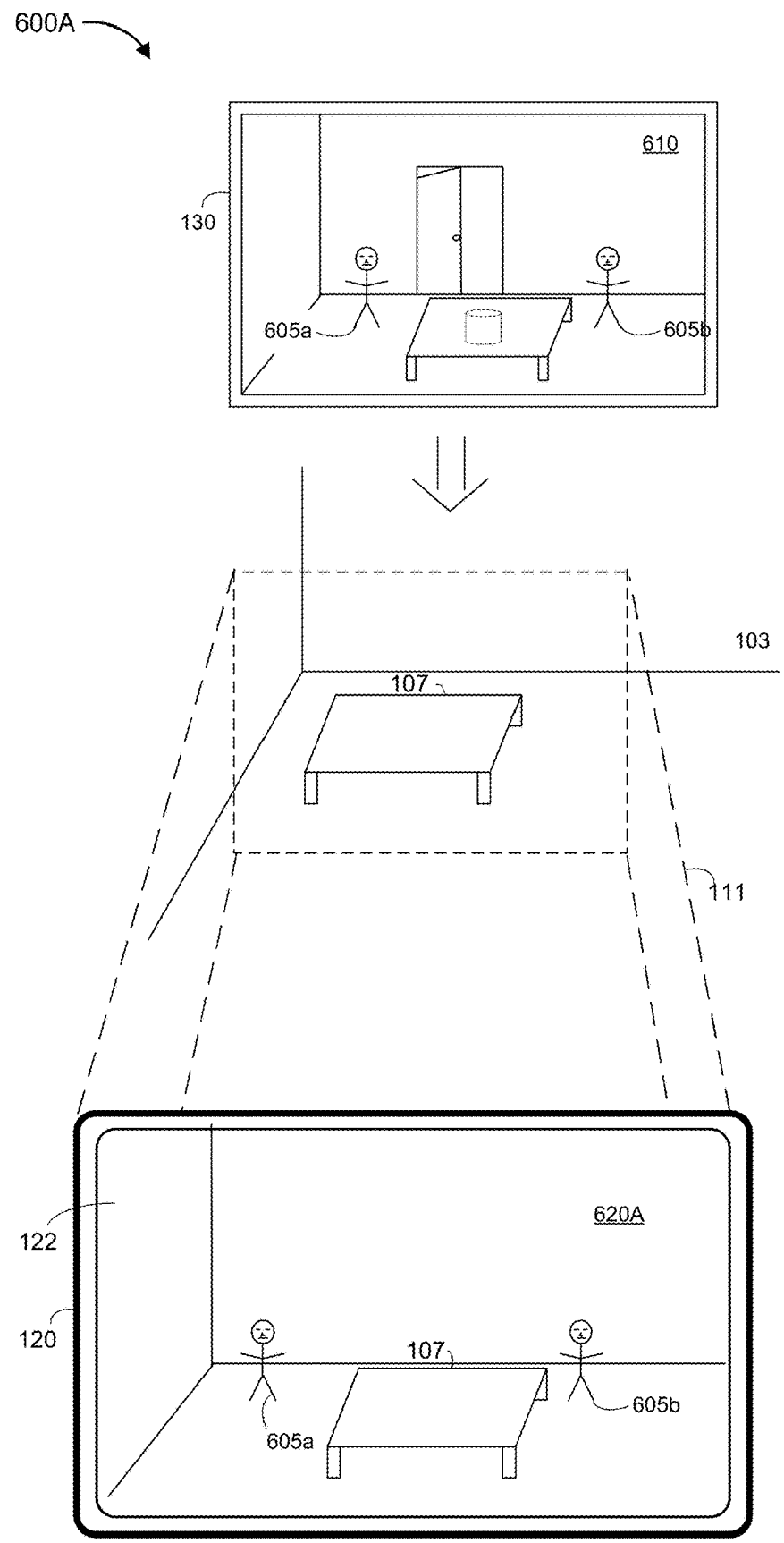
FIGS. 6A-6D illustrate example playback scenarios in accordance with some implementations.

As shown in FIG. 6A, for example, the scene playback scenario 600A includes a transition from the display of the video content 610 that includes the characters 605a and 605b via the display device 130 to the presentation of the SR companion content 620A via the electronic device 120. In this example, the characters 605a and 605b within the video content 610 are displayed on the display 122 of the electronic device 120 as if they are present within the physical setting 103 and standing around the table 107. The user of the electronic device 120 is able to instruct the characters 605a and 605b to perform a task or mission associated with a current scene within the video content 610 and/or converse/interact with the characters 605a and 605b. In other words, in some implementations, the video content 610 is transferred into the environs of the user, and the user is able to interact with the SR companion content 620A. For example, the user is holding the electronic device 120, and the electronic device 120 enables video pass-through of the physical setting 103.

In some implementations, the display device 130 concurrently displays the video content 610 while the electronic device 120 presents the SR companion content 620A. In some implementations, the video content 610 is paused while the electronic device 120 presents the SR companion content 620A. In some implementations, both the video content 610 and the SR companion content 620A are presented via the electronic device 120.

Figure 6B:
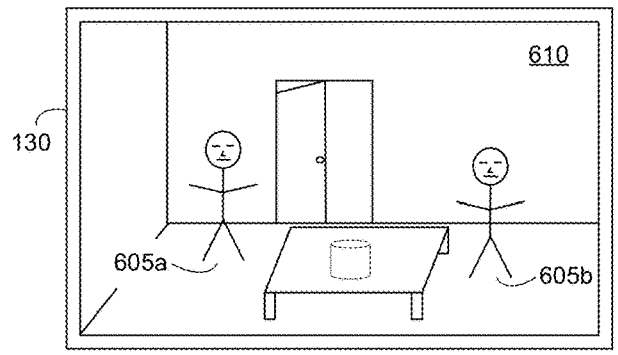
Figure 6B:
Figure 6B:
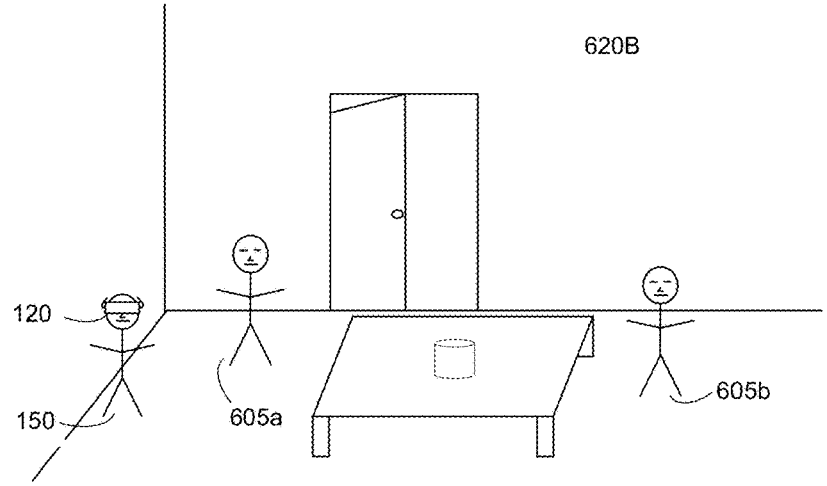
Figure 6B:
Figure 6B:
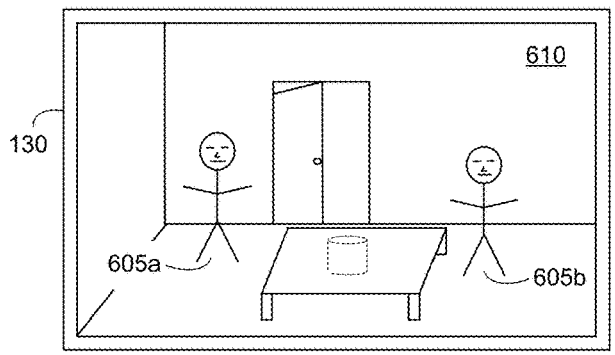

As shown in FIG. 6B, for example, the scene playback scenario 600B includes a first transition from the display of the video content 610 that includes the characters 605a and 605b via the display device 130 to the presentation of the SR companion content 620B via the electronic device 120. In this example, the user 150 may be placed within the plot setting to perform a task or mission associated with the plot setting, explore the plot setting, and/or converse with the characters 605a and 605b while present in an SR reconstruction of the plot setting (e.g., within a VR setting). In other words, in some implementations, the user 150 is placed into the plot setting and is able to interact with the SR companion content 620B. Continuing with this example, the playback scenario 600B includes a second transition from the presentation of the SR companion content 620B via the electronic device 120 to the display of the video content 610 via the display device 130. In some implementations, each plot setting is associated with one instance of SR companion content. In some implementations, each plot setting is associated with multiple instance of SR companion (e.g., different mission or tasks associated with the plot setting) content that may be separately selected by the user.

In some implementations, the display device 130 concurrently displays the video content 610 while the electronic device 120 presents the SR companion content 620B. In some implementations, the video content 610 is paused while the electronic device 120 presents the SR companion content 620B. In some implementations, both the video content 610 and the SR companion content 620B are presented via the electronic device 120.

As one example, the user 150 is wearing the electronic device 120 between the aforementioned transitions. In this example, with reference to FIGS. 1B and 6B, the electronic device 120 enables video pass-through of the physical setting 105 so that the user 150 can see the video content 610 displayed via the display device 130 while wearing the electronic device 120. As another example, both the video content 610 and the SR companion content 620B are displayed via the electronic device 120.

Figure 6C:
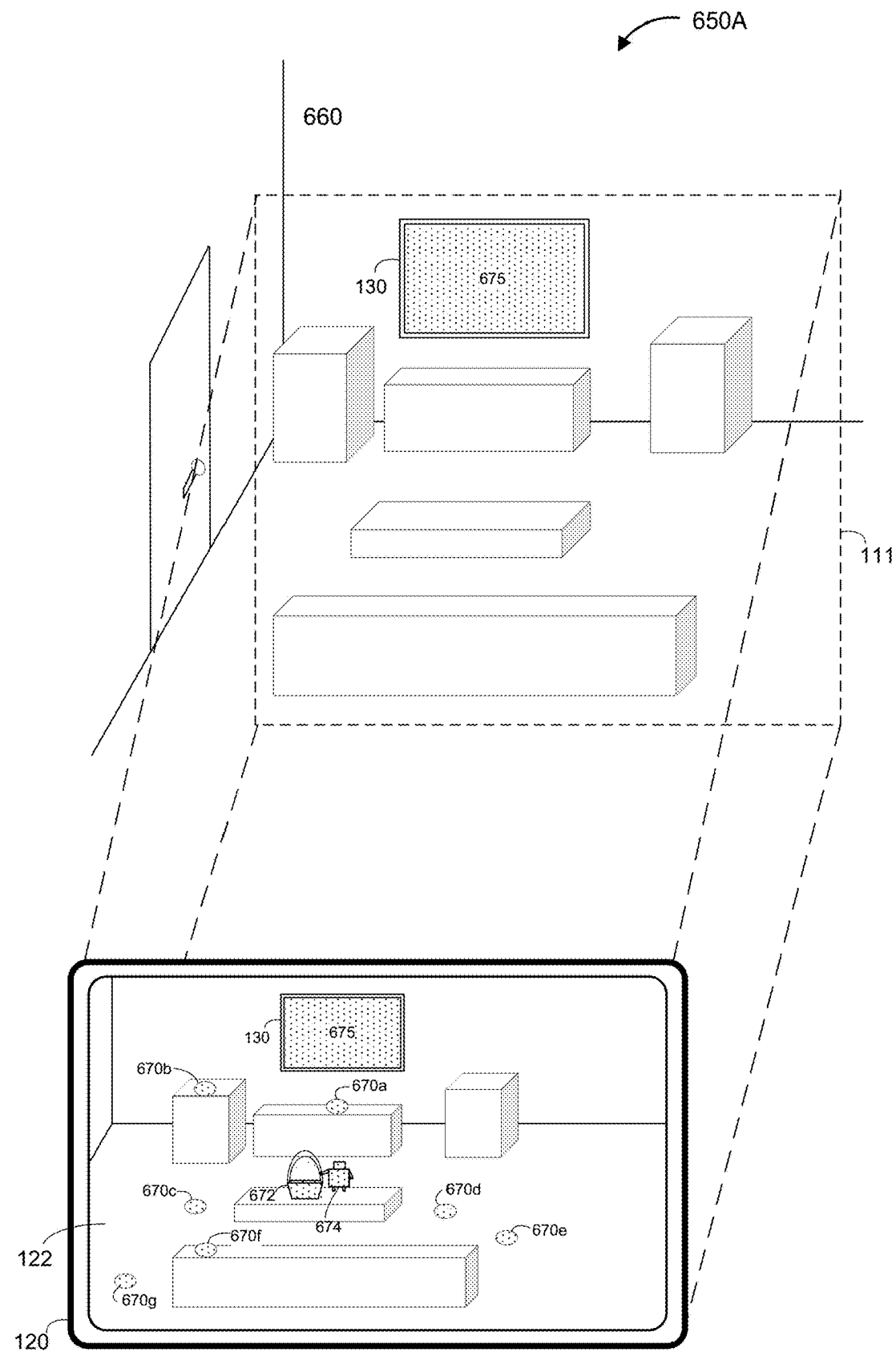

As shown in FIG. 6C, for example, the scene playback scenario 650A includes the display device 130 displaying video content 675 (e.g., a TV episode or movie) and the user holding the electronic device 120, while the electronic device 120 displays video pass-through of the physical setting 660 (e.g., the user's living room) on the display 122. After requesting to view SR companion content associated with the video content 675, the electronic device 120 presents SR content 670a, 670b, 670c, 670d, 670e, 670f, 670g, 672, and 674 associated with the video content 675. For example, in FIG. 6C, the user is tasked with collecting the SR content 670a, 670b, 670c, 670d, 670e, 670f, and 670g (e.g., AR candies) scattered around the physical setting 660 and placing them in the SR basket 672 for the SR extraterrestrial protagonist 674 associated with the video content 675 by performing touch gestures on the display 122. As such, in this example, the SR companion content leverages the current environs of the user (e.g., the physical setting 660 in FIG. 6C) when providing a task for the user 150 to perform (e.g., collecting AR candies).

Figure 6D:
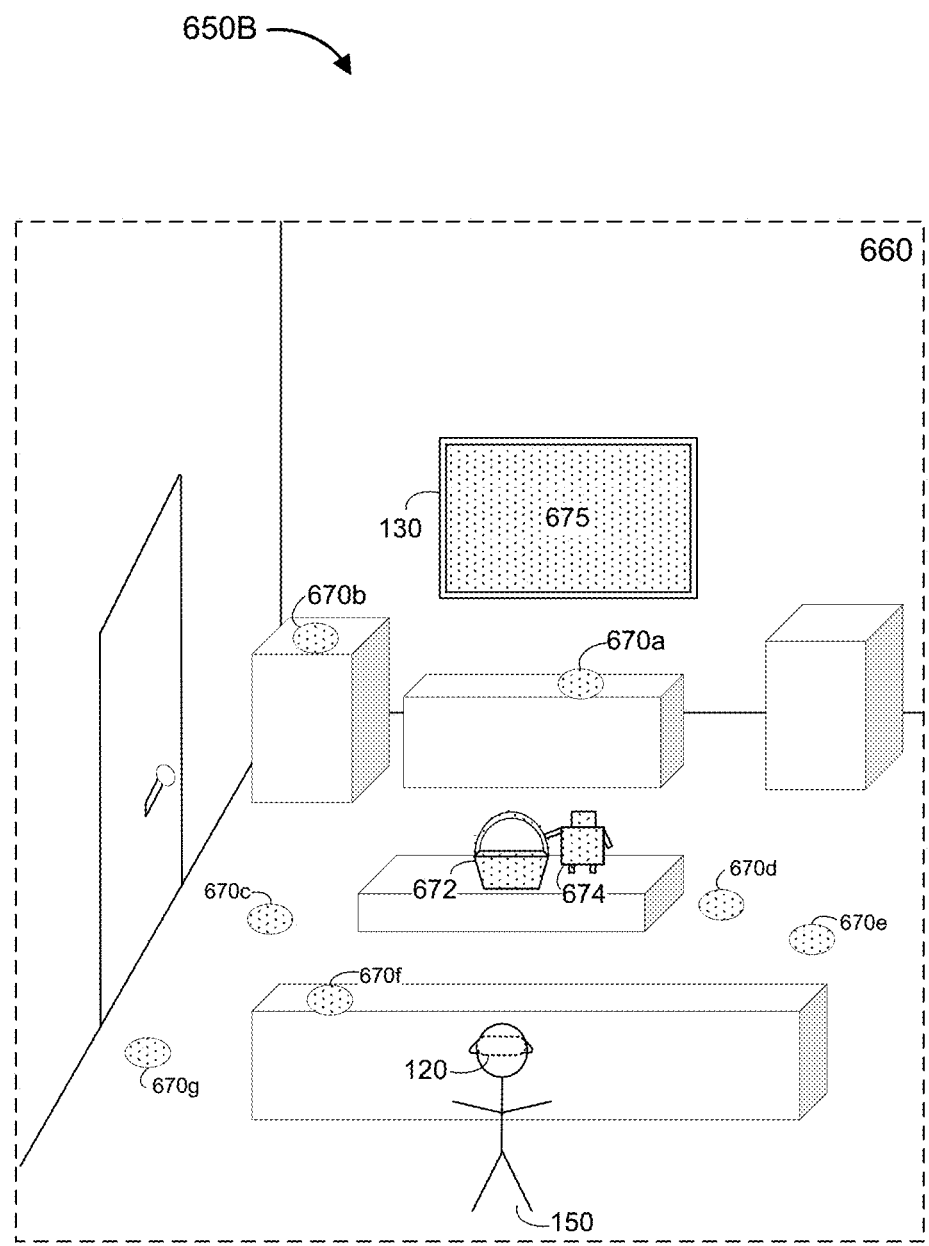

As shown in FIG. 6D, for example, the scene playback scenario 650B includes the display device 130 displaying video content 675 (e.g., a TV episode or movie) and the user 150 wearing the electronic device 120 on his/her head (e.g., AR-enabled glasses) with optical see-through of the physical setting 660 (e.g., the user's living room). After requesting to view SR companion content associated with the video content 675, the electronic device 120 presents SR content 670a, 670b, 670c, 670d, 670e, 670f, 670g, 672, and 674 associated with the video content 675. For example, in FIG. 6D, the user 150 is tasked with collecting the SR content 670a, 670b, 670c, 670d, 670e, 670f, and 670g (e.g., SR candies) scattered around the physical setting 660 and placing them in the SR basket 672 for the SR extraterrestrial protagonist 674 associated with the video content 675. As such, in this example, the SR companion content leverages the current environs of the user (e.g., the physical setting 660 in FIG. 6D) when providing a task for the user 150 to perform (e.g., collecting AR candies).

Figure 7:
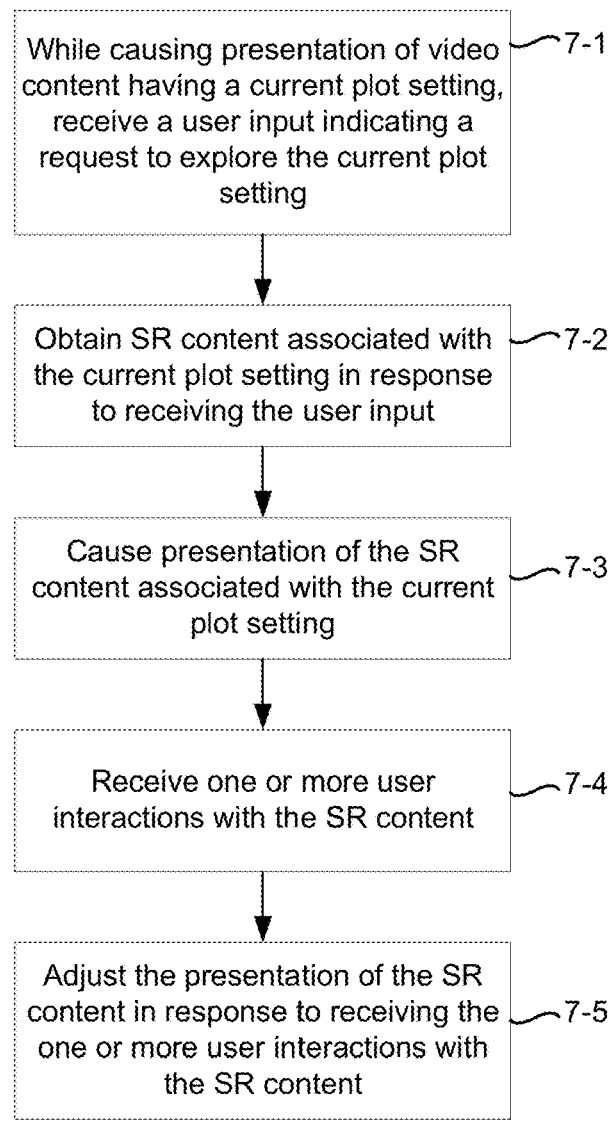
FIG. 7 is a flowchart representation of a method of presenting SR companion content in accordance with some implementations.

FIG. 7 is a flowchart representation of a method 700 of presenting SR companion content in accordance with some implementations. In various implementations, the method 700 is performed by a device with non-transitory memory and one or more processors coupled with the non-transitory memory (e.g., the controller 110 in FIGS. 1B and 2, the electronic device 120 in FIGS. 1A-1B and 3, or a suitable combination thereof). In some implementations, the method 700 is performed by processing logic, including hardware, firmware, software, or a combination thereof. In some implementations, the method 700 is performed by a processor executing code stored in a non-transitory computer-readable medium (e.g., a memory). Briefly, in some circumstances, the method 700 includes: while causing presentation video content having a current plot setting, receiving a user input indicating a request to explore the current plot setting; obtaining (e.g., receiving, retrieving, or generating) SR content associated with the current plot setting in response to receiving the user input; causing presentation the SR content associated with the current plot setting; receiving one or more user interactions with the SR content; and adjusting the presentation of the SR content in response to receiving the one or more user interactions with the SR content.

As represented by block 7-1, the method 700 includes, while causing presentation video content having a current plot setting, receiving a user input indicating a request to explore the current plot setting. In some implementations, the video content is being displayed on a TV and the SR content is presented via an HMD. In some implementations, a controller coordinates the transition between the TV and the HMD. In some implementations, the video content includes a notification (e.g., superimposed or overlaid on the video content) that SR companion content is available for the current plot setting for the next X seconds. In some implementations, the user input corresponds to a voice command, selection of a TV remote button, movement of the TV remote, head movement, eye movement, or the like while the notification is displayed. In some implementations, both the video content and the SR content are presented via an HMD.

As represented by block 7-2, the method 700 includes obtaining (e.g., receiving, retrieving, or generating) SR content associated with the current plot setting in response to receiving the user input. In some implementations, the SR content associated with the current plot setting is obtained from a local or remote library (e.g., a remote server, a third-party content provider, or the like) of SR content associated with the video content. In some implementations, the SR content is generated on-the-fly based at least in part on the video content and the current plot setting. In some implementations, the SR content is generated on-the-fly according to a set of predefined rules and policies (e.g., the ability for the user to interact in SR with the current plot setting and characters in the current plot setting).

As represented by block 7-3, the method 700 includes causing presentation the SR content associated with the current plot setting. In some implementations, the video content is associated with a library of available SR companion content. For example, the SR companion content corresponds to the user being placed into the current plot setting to explore the setting and interact with characters in the plot setting. As such, the user can explore the plot setting with a richness not enabled by the fixed camera angle of the flat video content. In one example, the user's exploration is restricted to the room associated with the current plot setting. In another example, the user is able to explore other rooms adjacent to the current plot setting. In yet another example, the SR companion content corresponds to the user being placed into the current plot setting and tasked with completing a mission to drive the plot forward. In yet another example, the SR companion content corresponds to the user being placed into the making/filming of the current plot setting.

As represented by block 7-4, the method 700 includes receiving one or more user interactions with the SR content. As represented by block 7-5, the method 700 includes adjusting the presentation of the SR content in response to receiving the one or more user interactions with the SR content. In some implementations, the SR companion content is driven based on the user interactions therewith such as body pose inputs/actions, eye movements, voice commands, and/or the like. As one example, the user performs a task or mission associated with the plot setting such as retrieving an item associated with the plot setting or clearing a path in the plot setting of bad guys or debris for the protagonist of the video content. As another example, the user inspects objects in the plot setting, fights villains, questions characters in the plot setting, opens doors and explores adjacent rooms, locomotes within the plot setting, and/or the like (e.g., as shown in FIGS. 6A-6B). As yet another example, the SR companion content corresponds to an educational aide or auxiliary information associated with the video content such as an AR version of the Ho Chi Minh Trail or an AR battlefield map showing the location of military battalions while watching a documentary on the Vietnam War. As yet another example, the SR companion content leverages the user's current environs when providing a task for the user to perform such as collecting SR candies scattered around your living room to give to an extraterrestrial protagonist in the video content (e.g., as shown in FIGS. 6C-6D).

Figure 8:
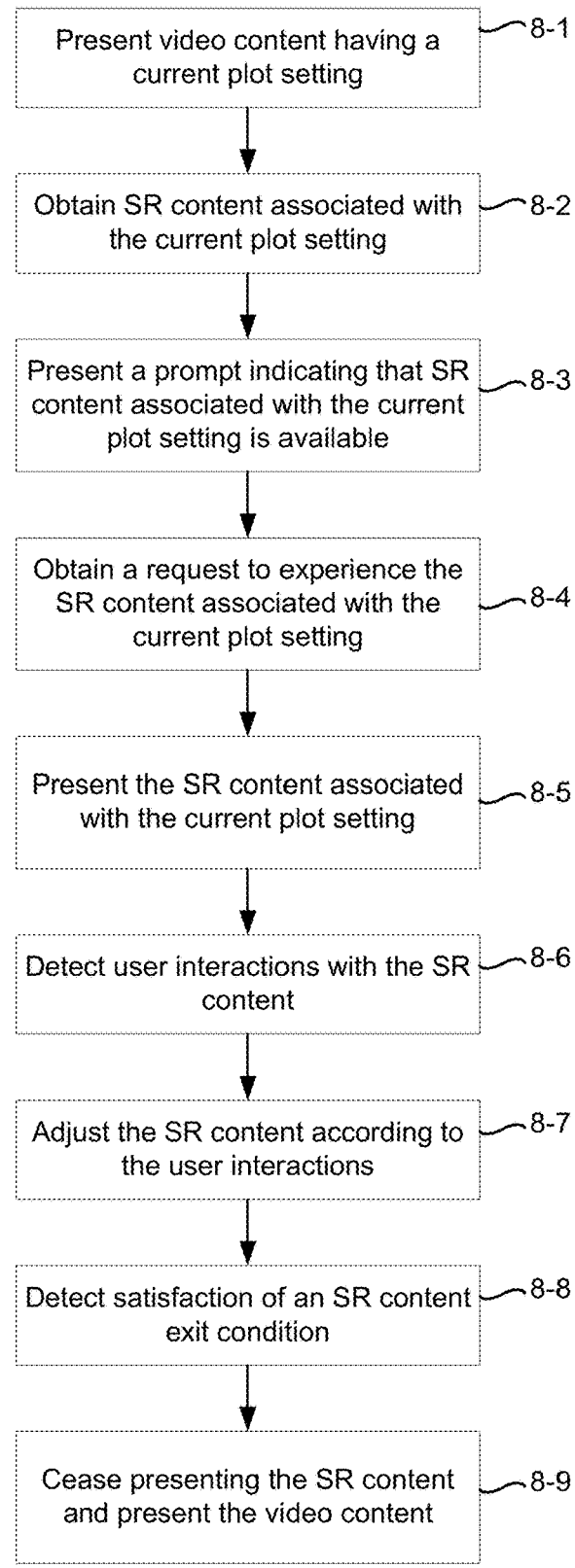
FIG. 8 is a flowchart representation of a method of presenting SR companion content in accordance with some implementations.

FIG. 8 is a flowchart representation of a method 800 of presenting SR companion content in accordance with some implementations. In various implementations, the method 800 is performed by a device with non-transitory memory and one or more processors coupled with the non-transitory memory (e.g., the controller 110 in FIGS. 1B and 2, the electronic device 120 in FIGS. 1A-1B and 3, or a suitable combination thereof). In some implementations, the method 800 is performed by processing logic, including hardware, firmware, software, or a combination thereof. In some implementations, the method 800 is performed by a processor executing code stored in a non-transitory computer-readable medium (e.g., a memory). Briefly, in some circumstances, the method 800 includes: presenting video content having a current plot setting; obtaining SR content associated with the current plot setting; presenting a prompt indicating that SR content associated with the current plot setting is available; obtaining a request to experience the SR content associated with the current plot setting; presenting the SR content associated with the current plot setting; detecting user interactions with the SR content associated with the current plot setting; adjusting the SR content according to the user interactions; and ceasing to present the SR content and presenting the video content.

As represented by block 8-1, the method 800 includes presenting video content having a current plot setting. In some implementations, the electronic device 120 or a component thereof (e.g., the SR presenter 344) presents the video content (e.g., the video content 610 in FIGS. 6A-6B) via the one or more displays 312. In some implementations, the display device 130 or a component thereof (e.g., the content presenter 444) presents the video content via the display 412. In some implementations, the controller 110 or a component thereof (e.g., the content management unit 248) causes and manages the presentation of the video content by the electronic device 120 and/or the display device 130. For example, the video content corresponds to a TV episode or movie.

As represented by block 8-2, the method 800 includes obtaining (e.g., receiving, retrieving, or generating) SR content associated with the current plot setting. In some implementations, the controller 110 or a component thereof (e.g., the companion content obtainer 246) obtains the SR content associated with the current plot setting from a local library or a remote library (e.g., a remote server, a third-party content provider, or the like). In some implementations, the SR content is obtained from a library associated with the video content currently being viewed by the user. In some implementations, the SR content is generated on-the-fly based at least in part on the video content and the current plot setting. In some implementations, the SR content is generated on-the-fly according to a set of predefined rules and policies (e.g., the ability for the user to interact in SR with the current plot setting and characters in the current plot setting).

As represented by block 8-3, the method 800 includes presenting a prompt indicating that SR content associated with the current plot setting is available. In some implementations, after obtaining the SR content associated with the current plot setting in the video content, the controller 110 or a component thereof (e.g., the content management unit 248) transmits a message to the electronic device 120 and/or the display device 130 indicating that SR companion content is available for the current plot setting in the video content. In some implementations, a subtle transition affordance or notification is embedded within the video content indicating that SR companion content associated with the current plot setting in the video content is available (e.g., the companion content).

As represented by block 8-4, the method 800 includes obtaining a request to experience the SR content associated with the current plot setting. For example, when the user selects the transition affordance (e.g., via a voice command received by the electronic device 120 or the display device 130, a remote-control device associated with the display device 130, or the like), the electronic device 120 or display device 130 provides a message to the controller 110 indicating the user's intent to experience the SR content associated with the current plot setting. Continuing with this example, in response to receiving the message, the controller 110 or a component thereof (e.g., the data transmitter 250) provides presentation data (e.g., rendered SR frames or access to the SR content associated with the current plot setting) to the electronic device 120 for presentation to the user.

As represented by block 8-5, the method 800 includes presenting the SR content associated with the current plot setting. In some implementations, the electronic device 120 or a component thereof (e.g., the SR presenter 344) presents the SR content (e.g., the SR companion content 620A in FIG. 6A) associated with the current plot setting via the one or more displays 312. In some implementations, the user experience is transitioned from a first electronic device (e.g., a TV, tablet, or the like) displaying flat video content, to a second SR capable device (e.g., an HMD, phone, tablet, etc.) displaying the SR content associated with the video content (e.g., the companion SR content). As one example, FIG. 6B illustrates the example playback scenario 600B where the user views the video content 610 via the display device 130 and, then, transitions to the user viewing the SR companion content 620B via the electronic device 120. In some implementations, both the video content 610 and the SR companion content 620B are presented via the electronic device 120.

In some implementations, the video content continues concurrently while the user explores the current plot setting (e.g., within a time window dictated by the current plot setting). In some implementations, the video content pauses in response to user exploration of plot setting beyond a threshold region (e.g., user explores a room adjacent to the current plot setting). In some implementations, the video content is paused while the user explores the current plot setting.

As represented by block 8-6, the method 800 includes detecting user interactions with the SR content associated with the current plot setting. In some implementations, the electronic device 120 or a component thereof (e.g., the user interaction handler 346) detects user interactions with the SR companion content. In some implementations, the electronic device 120 or a component thereof (e.g., the data transmitter 350) sends data associated with the user interactions to the controller 110. For example, the user picks up an object in the SR reconstruction of the current plot setting. As another example, the user fights humanoid characters in the current plot setting. In yet another example, the user speaks with characters in the current plot setting. In yet another example, the user walks around the current plot setting to view the current plot setting from various angles. In some implementations, the video content is paused while the user completes a task or mission associated with the current plot setting in order to advance the video content.

As represented by block 8-7, the method 800 includes adjusting the SR content according to the user interactions. In some implementations, the electronic device 120 or a component thereof (e.g., the content management unit 248) adjusts the SR companion content according to the user interaction detected at block 8-6. In some implementations, the controller 110 or a component thereof (e.g., the content management unit 248) adjusts the SR companion content according to the user interactions detected at block 8-6. For example, if a user drops an SR coffee cup from the current plot setting, the SR coffee cup should subsequently fall to the floor and break and/or spill a liquid. In some implementations, as the user interacts with the SR content, the electronic device 120 provides audio, haptic, skin shear, temperature, or the like feedback.

As represented by block 8-8, the method 800 includes detecting satisfaction of an SR exit condition. In some implementations, the exit condition is satisfied when the user provides an escape command (e.g., a gesture, voice command, or the like). In some implementations, the exit condition is satisfied when the user completes a mission or task associated with the current plot setting (e.g., defeating several henchmen in simulated hand-to-hand combat, solving a puzzle, or questioning a character to receive particular information). In some implementations, the exit condition is satisfied when a predefined time period expires.

As represented by block 8-9, the method 800 includes ceasing to present the SR content and presenting the video content. In some implementations, the electronic device 120 or a component thereof (e.g., the SR presenter 344) ceases presentation of the SR content associated with the current plot setting (e.g., the SR companion content) via the one or more displays 312. Subsequently, in some implementations, the electronic device 120 or a component thereof (e.g., the SR presenter 344) presents the video content via the one or more displays 312. Alternatively, in some implementations, the display device 130 or a component thereof (e.g., the content presenter 444) presents the video content via the display 412.

In some implementations, the user experience is transitioned from the second SR device (e.g., HMD, phone, tablet, etc.) displaying the SR content associated with the video content (e.g., the companion SR content), to the first device (e.g., TV, tablet, or the like) displaying the flat video content. As one example, FIG. 6B illustrates the example playback scenario 600B where the user views the SR companion content 620B via the electronic device 120, and, then, transitions to the user viewing the video content 610 via the display device 130.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a computing system including non-transitory memory and one or more processors, wherein the computing system is communicatively coupled to a display device and one or more input devices:
while causing presentation of video content via the display device, obtaining, via the one or more input devices, a user input indicating a request associated with a current portion of the video content;
in response to receiving the user input, obtaining synthesized reality (SR) content and one or more missions or tasks associated with the current portion of the video content;
concurrently causing presentation of, via the display device, the SR content and an SR character associated with the current portion of the video content;
obtaining, via the one or more input devices, one or more commands associated with driving the SR character within the SR content; and
adjusting the SR content in response to obtaining the one or more commands associated with driving the SR character within the SR content; and
in response to determining that the one or more commands associated with driving the SR character within the SR content satisfy an exit condition for the current portion, ceasing to cause presentation of the SR content and continuing causing presentation of the video content, wherein the exit condition for the current portion is satisfied when the one or more commands associated with driving the SR character within the SR content cause the SR character to complete at least one of the one or more missions or tasks associated with the current portion of the video content.

2. The method of claim 1, further comprising:
causing presentation of, via the display device, an indication of the one or more missions or tasks associated with the current portion of the video content.

3. The method of claim 1, wherein the SR content is obtained from a library associated with the video content.

4. The method of claim 1, wherein the SR content is generated on-the-fly based at least in part on the current scene of the video content.

5. The method of claim 1, wherein the SR content continues concurrently while causing presentation of the SR content.

6. The method of claim 5, wherein the SR content is paused in response to the user breaching a first threshold region associated with the SR content.

7. The method of claim 1, wherein the SR content is paused while causing presentation of the SR content.

8. The method of claim 1, further comprising:
while presenting the SR content and in response to receiving a particular command from the user, ceasing to present the SR content and continuing causing presentation of the current portion of the video content.

9. The method of claim 1, further comprising:
while causing presentation of the current portion of the video content, causing presentation, via the display device, of an affordance indicating availability of the SR content associated with the current portion of the video content, wherein the user input corresponds to selection of the affordance.

10. The method of claim 1, wherein the one or more commands associated with driving the SR character within the SR content include at least one of picking up an object associated with the SR content, physically engaging with another SR character associated with the SR content, or speaking with the other SR character associated with the SR content.

11. The method of claim 1, further comprising:
prior to obtaining the one or more commands associated with driving the SR character within the SR content, causing presentation, via the display device, of a menu for selecting one of the one or more missions or tasks associated with the current portion of the video content;
detecting, via the one or more input devices, an additional user input selecting a respective mission or task among the one or more missions or tasks.

12. A computing system comprising:
one or more processors;
a non-transitory memory;
an interface for communicating with a display device and one or more input devices; and
one or more programs stored in the non-transitory memory, which, when executed by the one or more processors, cause the computing system to:
while causing presentation of video content via the display device, obtain, via the one or more input devices, a user input indicating a request associated with a current portion of the video content;
in response to receiving the user input, obtain synthesized reality (SR) content and one or more missions or tasks associated with the current portion of the video content;
concurrently cause presentation of, via the display device, the SR content and an SR character associated with the current portion of the video content;
obtain, via the one or more input devices, one or more commands associated with driving the SR character within the SR content; and
adjust the SR content in response to obtaining the one or more commands associated with driving the SR character within the SR content; and
in response to determining that the one or more commands associated with driving the SR character within the SR content satisfy an exit condition for the current portion, cease to cause presentation of the SR content and continue causing presentation of the video content, wherein the exit condition for the current portion is satisfied when the one or more commands associated with driving the SR character within the SR content cause the SR character to complete at least one of the one or more missions or tasks associated with the current portion of the video content.

13. The computing system of claim 12, wherein the one or more programs further cause the computing system to:
cause presentation of, via the display device, an indication of the one or more missions or tasks associated with the current portion of the video content.

14. The computing system of claim 12, wherein the SR content is obtained from a library associated with the video content.

15. The computing system of claim 12, wherein the SR content is generated on-the-fly based at least in part on the current scene of the video content.

16. The computing system of claim 12, wherein the one or more programs further cause the computing system to:
while causing presentation of the current portion of the video content, cause presentation of, via the display device, an affordance indicating availability of the SR content associated with the current portion of the video content, wherein the user input corresponds to selection of the affordance.

17. The computing system of claim 12, wherein the one or more commands associated with driving the SR character within the SR content include at least one of picking up an object associated with the SR content, physically engaging with another SR character associated with the SR content, or speaking with the other SR character associated with the SR content.

18. A non-transitory memory storing one or more programs, which, when executed by one or more processors of a computing system with an interface for communicating with a display device and one or more input devices, cause the computing system to:
while causing presentation of video content via the display device, obtain, via the one or more input devices, a user input indicating a request associated with a current portion of the video content;
in response to receiving the user input, obtain synthesized reality (SR) content and one or more missions or tasks associated with the current portion of the video content;
concurrently cause presentation of, via the display device, the SR content and an SR character associated with the current portion of the video content;
obtain, via the one or more input devices, one or more commands associated with driving the SR character within the SR content; and
adjust the SR content in response to obtaining the one or more commands associated with driving the SR character within the SR content; and
in response to determining that the one or more commands associated with driving the SR character within the SR content satisfy an exit condition for the current portion, cease to cause presentation of the SR content and continue causing presentation of the video content, wherein the exit condition for the current portion is satisfied when the one or more commands associated with driving the SR character within the SR content cause the SR character to complete at least one of the one or more missions or tasks associated with the current portion of the video content.

19. The non-transitory memory of claim 18, wherein the one or more programs further cause the device to:
cause presentation of, via the display device, an indication of the one or more missions or tasks associated with the current portion of the video content.

20. The non-transitory memory of claim 18, wherein the SR content is obtained from a library associated with the video content.

21. The non-transitory memory of claim 18, wherein the SR content is generated on-the-fly based at least in part on the current scene of the video content.

22. The non-transitory memory of claim 18, wherein the one or more programs further cause the device to:
while causing presentation of the current portion of the video content, cause presentation of, via the display device, an affordance indicating availability of the SR content associated with the current portion of the video content, wherein the user input corresponds to selection of the affordance.

23. The non-transitory memory of claim 18, wherein the one or more commands associated with driving the SR character within the SR content include at least one of picking up an object associated with the SR content, physically engaging with another SR character associated with the SR content, or speaking with the other SR character associated with the SR content.

* * * * *